United States Patent [19]

Gruene et al.

[11] Patent Number: 4,979,665

[45] Date of Patent: Dec. 25, 1990

[54] PROCESS FOR PRODUCING A SPACER FOR THE TUBES OF A HEAT EXCHANGER

[75] Inventors: Christian Gruene, Fürstenfeldbruck; Karl Maier, Karlsfeld, both of Fed. Rep. of Germany

[73] Assignee: MTU Motoren - Und Turbinen-Union Munchen GmbH, Munich, Fed. Rep. of Germany

[21] Appl. No.: 391,866

[22] Filed: Aug. 10, 1989

[30] Foreign Application Priority Data

Aug. 16, 1988 [DE] Fed. Rep. of Germany ....... 3827679

[51] Int. Cl.$^5$ ............................................. B23K 31/02
[52] U.S. Cl. .............................. 228/183; 29/890.043; 228/155
[58] Field of Search ............................... 228/155, 183; 29/157.3 R, 890.043

[56] References Cited

FOREIGN PATENT DOCUMENTS 15239 1/1989 Japan ............................. 29/157.3 R
1364571 8/1974 United Kingdom .......... 29/157.3 R Primary Examiner—Kenneth J. Ramsey
Attorney, Agent, or Firm—Ladas & Parry

[57] ABSTRACT

A process of manufacturing a spacer element for spaced heat exchange tubes of a heat exchanger in which the tubes are of elliptical cross section and arranged in rows and columns. In the process a band of stranded interwoven fine wires are wound between and on the surfaces of the spaced heat exchange tubes and is fused to the tubes at the regions of contact therewith by a heating operation to form a spacer for holding the tubes in spaced relation. The heating operation can be carried out by heating the tubes and band in an oven, either in a vacuum or with a protective gas.

14 Claims, 5 Drawing Sheets

PROCESS FOR PRODUCING A SPACER FOR THE TUBES OF A HEAT EXCHANGER

FIELD OF INVENTION

The invention relates to spacing means for maintaining the spacing between heat exchange tubes of a matrix of a heat exchanger and to methods of producing the spacing means.

DESCRIPTION OF PRIOR ART

A heat exchanger is disclosed in DE-PS No. 3146090 which comprises two parallel ducts for conveying compressed air to which are connected U-shaped heat exchange tubes of a tube matrix. The heat exchange tubes are of elliptical cross section. The tube matrix is externally traversed by hot gases to heat compressed air supplied to the tubes by one duct and the heated compressed air is then supplied to the other duct from which the heated compressed air is supplied to a suitable utilization means, such as the combustion chamber of a gas turbine engine.

It is known in the art to use spacers to hold the heat exchange tubes of such a heat exchanger in spaced relation from one another. These spacers can be in the form of rigid sheet metal strips which are attached to the surface of the tubes. A disadvantage of the use of rigid spacers is that they are very expensive, especially due to the need for at least eight spacer elements at each location which are spot welded to one another and soldered to the surfaces of the heat exchange tubes. In an effort to reduce the cost of the spacers, bands in the form of steel wire trusses have been used in the tube matrix, as disclosed in GB patent No. 1,364,571. These spacers are relatively elastic, and have the disadvantage that they must be fastened in a particular manner so that they are not displaced in the longitudinal direction of the tube matrix. The possibility arises that these elastic spacing holders also migrate crosswise with respect to the tubes. Such migration is disadvantageous and should be prevented.

Thus, a fastening of an elastic spacer onto the individual small tubes of the tube matrix has been sought, in which movement of the spacer in a direction perpendicular to the tube matrix is avoided, while permitting movement of the tubes with respect to one another longitudinally.

In the operation of a heat exchanger of the known type which has been described and disclosed further in DE-OS No. 2,907,810 or DE-PS No. 3,146,090, high frequency oscillations occur in the tube matrix, particularly in combination with a gas turbine drive mechanism. These oscillations cause small movements between the individual tubes and the respective spacer. The oscillations may also result, for example, from shock loads in a vehicle in which the heat exchanger is installed. As a consequence, the tubes which are of thin wall construction have a limited service life, due to "high-frequency" abrasion. This can be prevented, as disclosed in DE-OS No. 3,329,202, by securing the spacer to the heat exchange tubes and permitting the movement of the tubes with respect to each other by providing a corresponding elasticity of the spacer. However, this has not been found possible in practice.

The attachment of an elastic spacing holder as disclosed in GB Patent No. 1,364,571 to the individual tubes by means of soldering is not feasible, since the respective steel wire trusses absorb the solder and thus a rigid unit is produced which prevents relative displacement of the tubes. If such an elastic spacer were welded to the tubes, for example, by spot welding, this would not be feasible, as the tubes have extremely thin wall thicknesses and they would be damaged by the spot welding process and permit leakage.

SUMMARY OF INVENTION

An objective of the invention is to provide a process by which a substantially abrasion-free attachment can be made between an elastic spacer and the individual heat exchange tubes, such that transverse movements of the tubes in the matrix are prevented while relatively small longitudinal movements are possible.

In order to satisfy the above and further objectives, the invention provides a process of manufacturing a spacer means for spaced heat exchange tubes of a heat exchanger compromising winding a band of stranded interwoven fine wires between and on the surfaces of spaced heat exchange tubes of a heat exchanger in which the tubes are arranged in rows and columns and fusing said band to said tubes at the regions of contact therewith by a single heating operation to form a spacer means for holding the tubes in spaced relation.

In accordance with the invention, said fusing is effected by heating the tubes and the band in an oven, at a temperature to achieve local surface diffusion of the materials of the band and the heat exchange tubes. The oven can be maintained under vacuum or a protective gas can be supplied.

In the fusion operation, particularly at high temperature in a vacuum, only a part of the wires of the band will always be fused to the respective surfaces of the tubes. Thus, the tubes of the heat exchanger will be relatively movable with respect to one another, so that differential heat expansions of the tubes are possible, particularly in the respective longitudinal direction of the tubes. Also, the attenuating effect of the elastic spacer means remains or is even improved by placing the stranded, interwoven fine wires of the band in a position to attenuate oscillations due to friction. In addition, the spacer means is fixed in the tube matrix, both in the longitudinal direction as well as in the transverse direction of the tubes.

The process is economical, since the attachment to the tubes of the band can be produced in a relatively simple way by a single heat treatment.

Within the framework of the invention, the material both of the elastic spacer means as well as that of the tubes is of particular importance for the fusion process as regards the temperature of heat treatment. In the present case, high temperature materials are used for both the elastic spacer means as well as for the tubes. Thus, materials based on nickel and cobalt are particularly applicable for the spacer means, while a high-temperature nickel-chromium alloy is preferred for the heat exchange tubes. According to this preferred selection of materials, the fusion process is conducted under vacuum at approximately 1,100° C.

In conventional heat exchangers, there is a need for providing a spacer in the curved bend region of the tube matrix, which on the one hand holds the tubes of the matrix at the required spacing, and on the other hand, guides the hot gas through the matrix so that an optimal flow is assured in the curved region by which there will be an increase in the residence time of the hot gas in the curved region to promote heat exchange in the tubes. In a further preferred embodiment of the invention, the spacer means is arranged only on specific parts of the tube matrix. Heretofore, it has been particularly difficult to position an elastic spacer and to prevent displacement in the longitudinal and transverse directions. The invention provides a simple and precise process for attachment of the spacer means in the curved region and for control of the length of the spacer means.

DETAILED DESCRIPTION OF PREFERRED EMBODIMENTS

Figure 1:
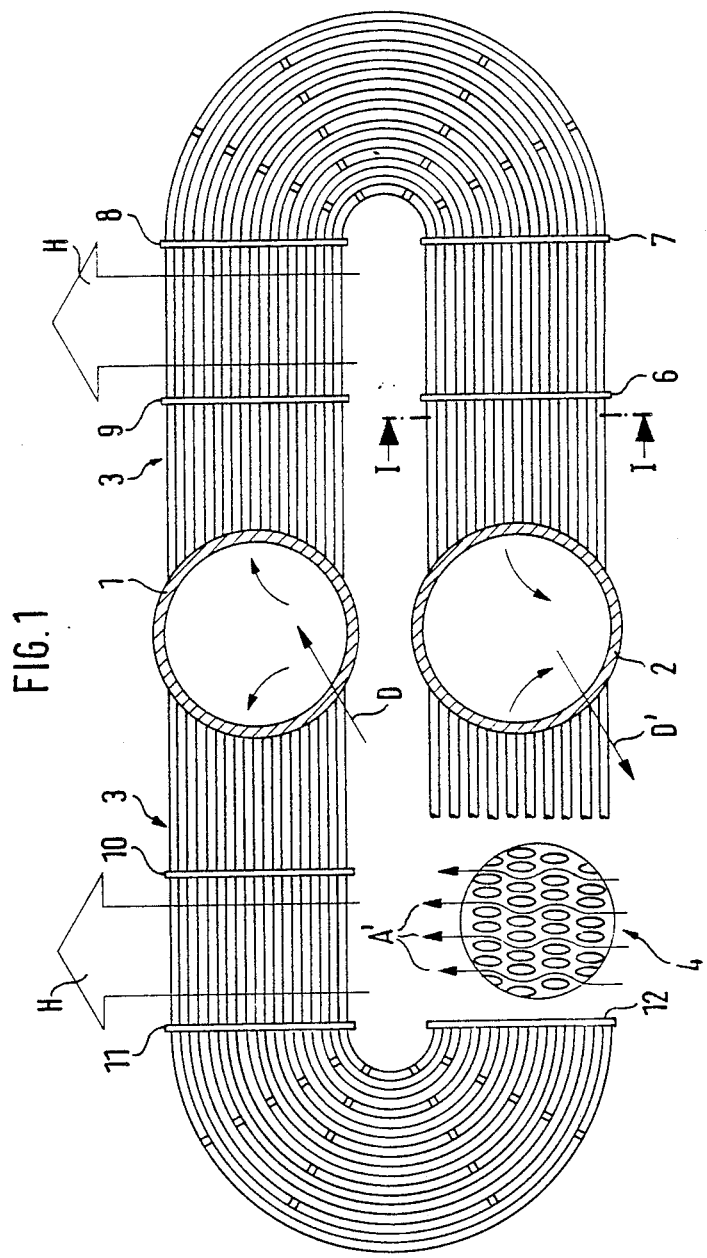
FIG. 1 is a sectional elevational view, partly broken away, of a cross-counterflow heat exchanger in which a portion of the heat exchange tubes is shown in transverse section.

FIG. 1 schematically illustrates a heat exchanger which comprises two ducts 1, 2 in parallel arrangement and a tube matrix 3 connected to ducts 1, 2 at each side thereof to project laterally from the ducts in opposite directions into the path of flow H of hot gases. Each tube matrix is composed of U-shaped tubes 4 having straight sections leading to the ducts and bend regions connecting the straight sections. The tubes of each matrix are of elliptical cross section as seen in the sectional view at the left-hand bottom portion of FIG. 1 so that the hot gas flow H travels along an undulating path through the spaces between the tubes. In this arrangement, the major axes of the elliptical section tubes are aligned in the direction of hot gas flow H.

In operation, compressed air D is supplied to the upper duct 1 and flows laterally into each matrix 3 through the straight sections of the tubes 4 and in the outer bend region of the matrix 3, the compressed air is reversed in direction and flows through the lower straight section of matrix 3 to the lower duct 2. In the course of flow through the tubes 4, the compressed air is heated by the hot gases H flowing on the outside of the tubes. The compressed air supplied to duct 2 is therefore heated and can be supplied by duct 2 in the direction of arrow D' to a suitable utilization means, such as the combustion chamber of a gas turbine engine. Spacers 6–12 are arranged along the tube matrix 3 to hold the tubes 4 in spaced relation.

Figure 2:
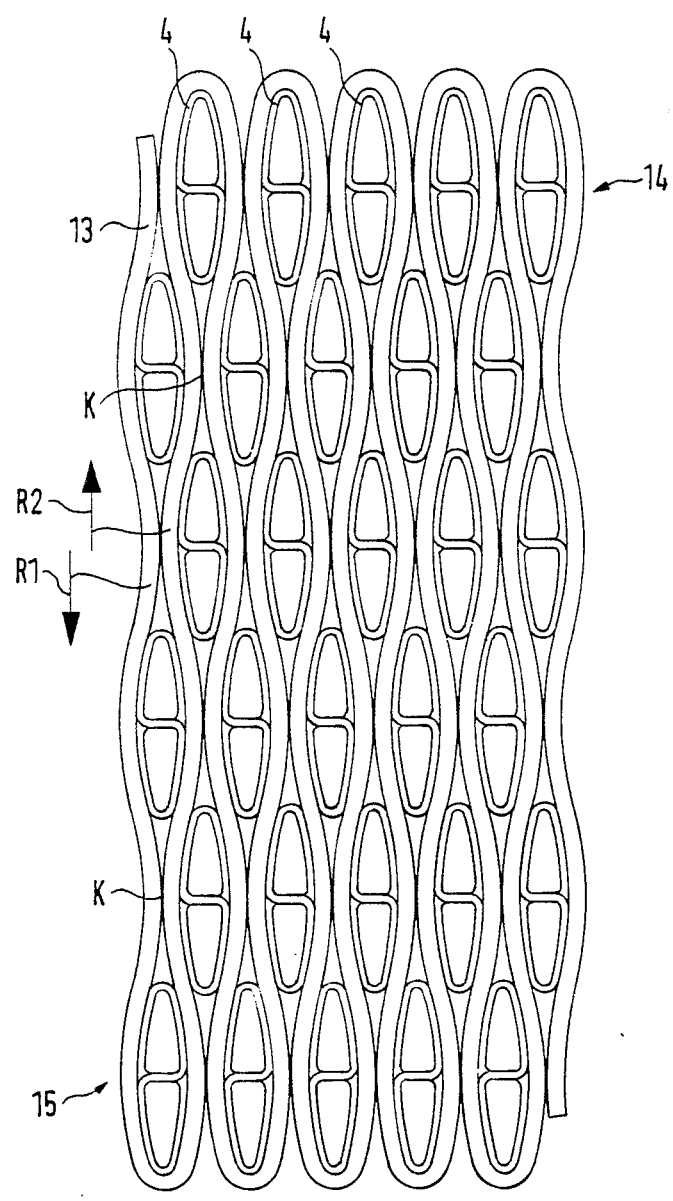
FIG. 2 is a transverse section taken on line I—I in FIG. 1 on enlarged scale of the heat exchange tubes of a tube matrix of the heat exchanger with an elastic spacer means according to the invention.
Figure 3:
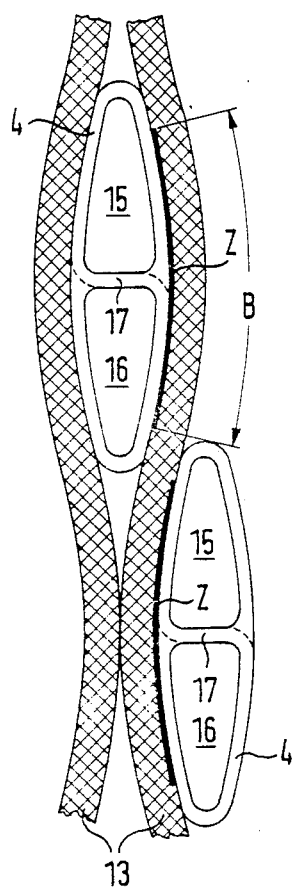
FIG. 3 is a diagrammatic illustration, on further enlarged scale, of two adjacent heat exchange tubes in FIG. 2 showing their attachment to the spacer means.

FIG. 2 shows a particular embodiment of a spacer, according to the invention, which comprises a band 13 comprised of a cable of interwoven fine wires which is wound around and between adjacent heat exchange tubes 4. In particular, the tubes of the matrix are arranged in columns and rows and the tubes in the rows are laterally offset such that the ends of the tubes in one row engage between adjacent tubes in the next row. The band 13 extends continuously in undulating manner around and between adjacent tubes to contact each of the tubes over a portion of its outer surface. At the top and bottom rows 14 and 15 respectively of the tubes, the band is wrapped around the respective upper and lower ends of the tubes. At the surfaces at which the band 13 contacts the tubes 4, they are joined together in a simple heating operation by local fusion. In FIG. 3 the fusion is effected in zones Z of length B. The fusion between the band 13 and the heat exchange tube 4 is obtained by a diffusion of the materials of the band and tube 4 at their contact surfaces when they are heated. Instead of making the band 13 as a cable of interwoven fine wires, the band 13 can be made as a strip of material or a cable of other than interwoven fine wires.

The fusion operation can be conducted in an oven under vacuum for purposes of effective local surface fusion and combination of the band 13 with all of the surfaces of tubes 4 that it contacts. The fusion operation can also be carried out in a protective gas atmosphere, such as argon.

In the fusion operation, the temperature utilized is based on the material of the band and the tubes and their compatibility.

In one embodiment of the invention, the band 13 consisted of stranded-type interwoven fine wires of a high-temperature alloy based on nickel-cobalt, while the heat exchange tubes 4 are made of a high-temperature nickel-chromium-containing alloy.

It is also within the contemplation of the invention to provide a rigid clamping means externally on the matrix in addition to the described spacer means to fixedly secure the spacing of the tubes 4 in correspondence with their connection to the ducts 1 and 2 in fluid-tight fixed relation.

In winding the band 13 around the tubes 4, the band travels in undulating manner around the surfaces of the successive tubes and undergoes successive reversal in curvature as shown at $R_1$ and $R_2$. Adjacent vertical windings of the band contact one another along surfaces of opposite curvature as shown at K.

As shown in FIG. 3, each tube 4 has a crossweb 17 which forms separate semi-elliptical internal channels 15, 16 for conveying the compressed air.

Figure 4:
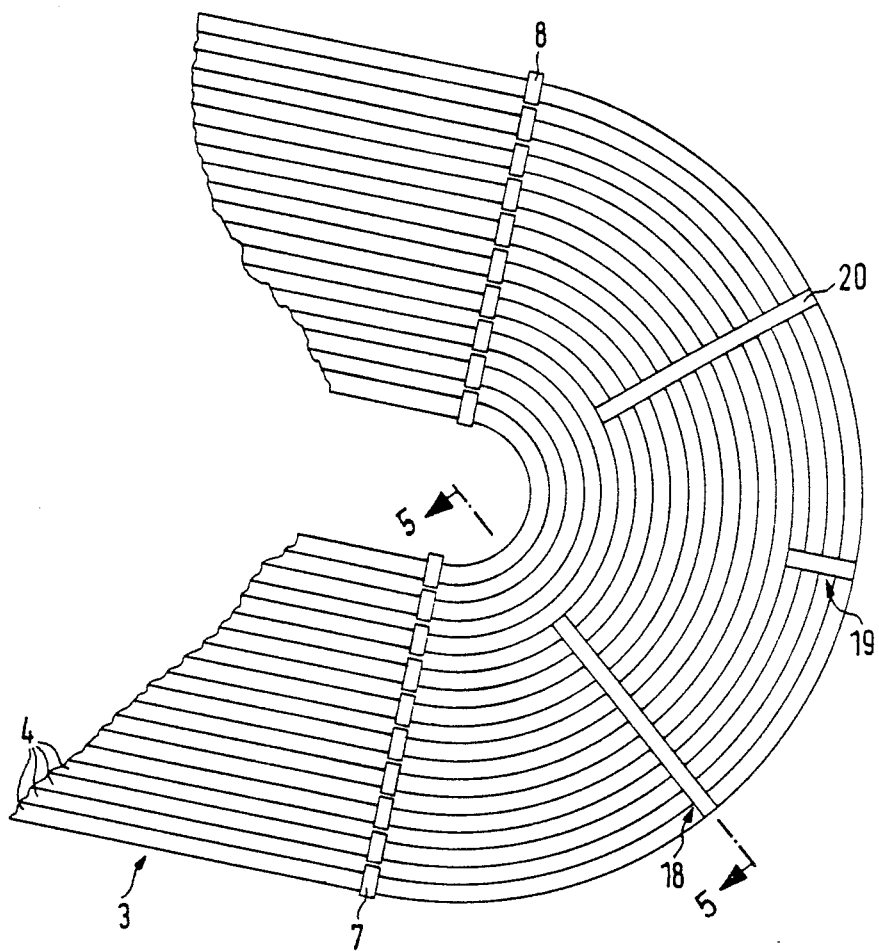
FIG. 4 illustrates, on enlarged scale, a bend region of the heat exchange tubes of the matrix with associated spacer means.

FIG. 4 shows the formation of spacers 18–20 in the curved bend region of the tube matrix 3. The spacers 18 and 20 are of different length than spacer 19 and are arranged symmetrically therewith for holding the curved regions of the tubes in determined spaced relation. This arrangement serves to throttle the flow of the hot gases H through the tube matrix which increases the residence time of the hot gases H in the curved region and achieves a substantially uniform hot gas mass flow distribution over the entire matrix.

A regular flow field with uniform flow cross sections between the tubes is present in the heat exchanger of FIG. 1 substantially only in the straight sections of the matrix 3. In the curved region, particularly in the outer portion thereof, there is a locally reduced flow path which leads, in part, to irregular flow ratios. In other words, the hot gas flow H has the tendency to seek the path of least resistance, thus here in the direction of the outer tubes of the bend region which leads to production of stresses in the regular flow-through region, i.e. the straight sections of the matrix. The invention thus creates an equilibration of the flow ratios to provide a more homogeneous total distribution of the mass of hot gases through the matrix to obtain an optimal degree of heat exchange in the critical curved region.

Figure 5:
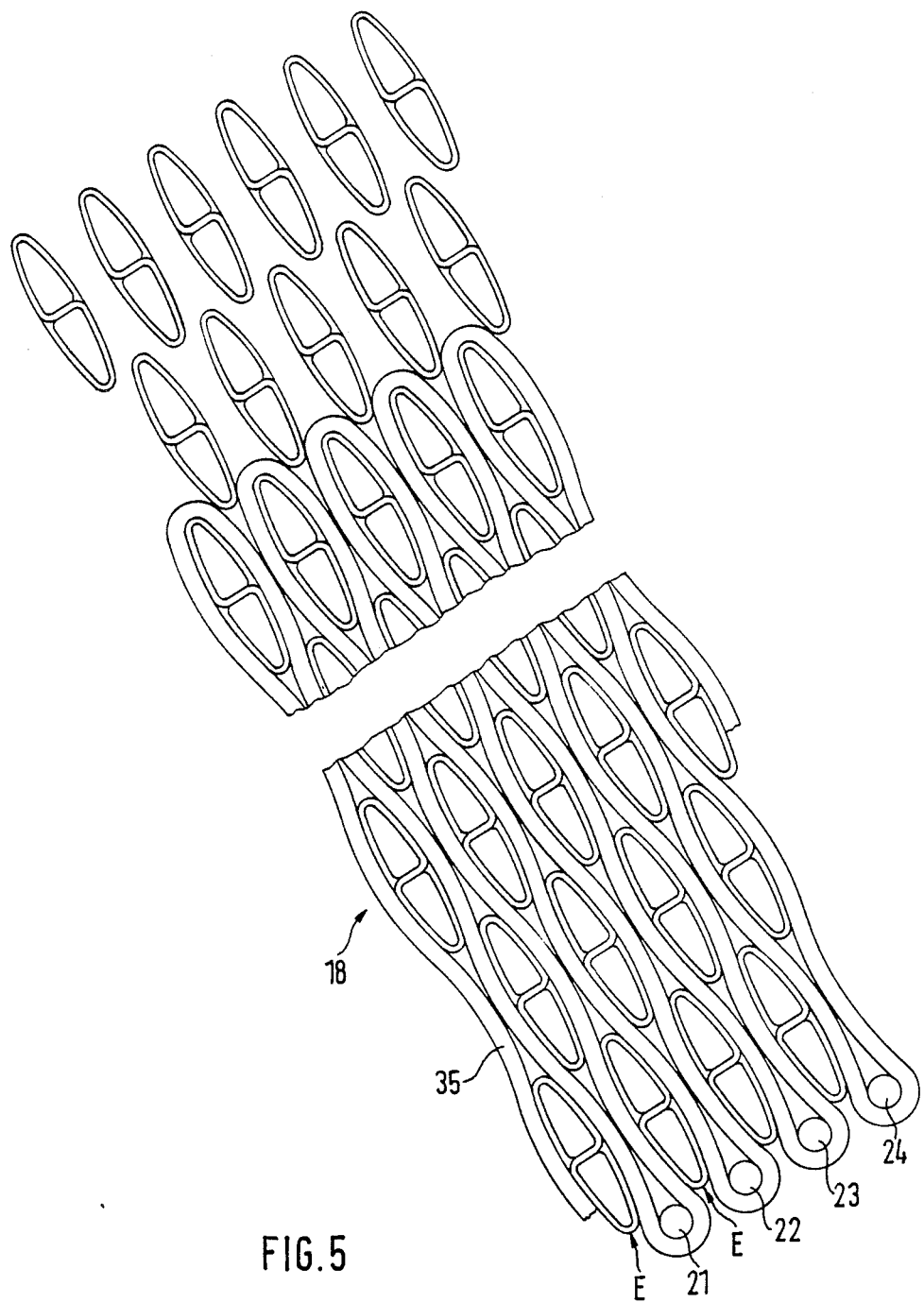
FIG. 5 is a sectional view taken on line 4—4 in FIG. 4.

An advantageous further embodiment of the invention is shown in FIG. 5, in which holding cables or wires 21, 22, 23, 24 are provided on the outer periphery of the heat exchange tubes 4 in the curved region of matrix 3 and following the curved contour. The wires are arranged between two adjacent outer tubes 4 at their outer ends E. A single strip or cable 35 of the spacer, which is produced from stranded-type fine wires, is wrapped around the respective holding wires 21–24 in traveling around the tubes.

The strip or cable 35 forms successive loops wrapped around the wires and travels in undulating fashion between and on the profile surfaces of the heat exchange tubes.

Although the invention has been disclosed in relation to specific embodiments thereof, it will become apparent to those skilled in the art that numerous modifications and variations can be made within the scope and spirit of the invention as defined in the attached claims.

What is claimed is:

1. A process of manufacturing a spacer means for spaced heat exchange tubes of a heat exchanger in which the tubes are arranged in rows and columns, said process comprising winding a band of stranded interwoven fine wires between and on the surfaces of spaced heat exchange tube of a heat exchanger in which the tubes are arranged in rows and columns and fusing said band to said tubes at the regions of contact therewith by a single heating operation to form a spacer means for holding the tubes in spaced relation.

2. A process as claimed in claim 1 wherein the tubes are of elliptical cross section and laterally offset in successive rows such that the tubes of one row engage between the tubes of the next row, said band being wound in undulating manner on the tubes in successive rows.

3. A process as claimed in claim 2 wherein the band is wound continuously in one plane between and on said heat exchange tubes.

4. A process as claimed in claim 3 wherein the band undergoes reversal of curvature as the band extends on successive tubes.

5. A process as claimed in claim 4 wherein the band extends along successive paths of opposite curvature in traveling between successive columns of tubes, the band contacting itself along successive paths and being joined thereat during the heating operation.

6. A process as claimed in claim 2 wherein the heat exchange tubes are arranged in a matrix having straight legs and a U-shaped bend region joining the straight legs, the straight legs being connected to respective ducts for conveying a fluid to and from the heat exchange tubes, heating the fluid in the tubes by flow of an external fluid around the tubes, the spacer means being formed in planes along the matrix of heat exchange tubes.

7. A process as claimed in claim 6 wherein spacer means are located in said bend region and have different radial lengths to provide a substantially uniform mass flow distribution of the external fluid around the matrix.

8. A process as claimed in claim 7 wherein the band is wrapped around the tubes in the outermost rows in said bend region and wires are disposed between adjacent tubes in said outermost row around which the band is wound.

9. A process as claimed in claim 2 wherein the band is wrapped around the tubes in the top and bottom rows to effect continuity in the winding.

10. A process as claimed in claim 1 wherein said fusing is effected at a temperature to achieve local surface diffusion of the materials of the band and heat exchange tubes.

11. A process as claimed in claim 10 wherein said temperature for fusing the band to the tubes is produced by heating the tubes and band in an oven.

12. A process as claimed in claim 11 comprising maintaining a vacuum in said oven during fusing.

13. A process as claimed in claim 11 comprising supplying a protective gas on said oven during fusing.

14. A process as claimed in claim 11 wherein the temperature of the oven is up to about 1100° C. with the material of the band being nickel-cobalt and the material of the tubes being nickel-chromium containing alloy.

* * * * *